US012680265B2

(12) United States Patent
Vera Torres et al.

(10) Patent No.: US 12,680,265 B2
(45) Date of Patent: Jul. 14, 2026

(54) DAMPING ELEMENT FOR EXCAVATOR BUCKETS

(71) Applicant: Minetec S.A., Santiago (CL)

(72) Inventors: Bernardo Luis Vera Torres, Santiago (CL); Fernando Esteban De La Fuente López, Santiago (CL); Antonio Flores, Santiago (CL)

(73) Assignee: Minetec S.A., Santiago (CL)

( * ) Notice: Subject to any disclaimer, the term of this patent is extended or adjusted under 35 U.S.C. 154(b) by 652 days.

(21) Appl. No.: 18/161,218

(22) Filed: Jan. 30, 2023

(65) Prior Publication Data

US 2023/0250608 A1 Aug. 10, 2023

(51) Int. Cl.
| | |
|---|---|
| *E02F 3/36* | (2006.01) |
| *E02F 3/40* | (2006.01) |
| *E02F 3/407* | (2006.01) |
| *F16F 9/00* | (2006.01) |

(52) U.S. Cl.
CPC ............ *E02F 3/401* (2013.01); *E02F 3/4075* (2013.01); *F16F 9/003* (2013.01)

(58) Field of Classification Search
CPC .......... E02F 3/401; E02F 3/4075; F16F 9/003
USPC ......................................... 414/720
See application file for complete search history.

(56) References Cited

U.S. PATENT DOCUMENTS

| | | | | | |
|---|---|---|---|---|---|
| 2,301,241 | A | * | 11/1942 | Biedess | E02F 3/3483 414/565 |
| 2,726,778 | A | * | 12/1955 | Hough | E02F 3/3408 414/711 |
| 2,860,795 | A | * | 11/1958 | Zoller | B65F 3/043 414/407 |
| 3,045,843 | A | * | 7/1962 | Bernotas | E02F 3/36 414/720 |
| 4,154,349 | A | * | 5/1979 | Christensen | E02F 3/36 414/720 |
| 4,422,819 | A | * | 12/1983 | Guest | E02F 3/401 37/406 |
| 5,006,031 | A | * | 4/1991 | Fossing | B60P 1/6445 280/43.23 |
| 5,560,451 | A | * | 10/1996 | Hincks | B66F 9/12 293/121 |
| 5,735,067 | A | * | 4/1998 | Isley | E02F 3/4075 37/444 |
| 7,674,084 | B2 | * | 3/2010 | Lech | E02F 3/435 91/41 |

* cited by examiner

*Primary Examiner* — Gerald McClain
(74) *Attorney, Agent, or Firm* — Hoffman Warnick LLC

(57) ABSTRACT

A shock-absorbing element (1) for buckets (2) with door (4) of cable excavator shovels, comprising push cables (6) connected to the bucket (2) to controls its inclination, to cushion impacts of the bucket (2) on a boom (3) of the excavator shovel, improving the protection of the boom (3) and the push cables (6), wherein the shock-absorbing element (1) comprising: an elongated metal base (9), hollow inside, comprising joining surfaces (10) at each end configured to join to the upper part of the door (4) of the bucket (2) and a central longitudinal recess (12) defining an intermediate space (7); and two rubber pieces (8) fixed to the metal base (9), being separated by the intermediate space (7), wherein the intermediate space (7) is configured to receive the push cables (6) of the bucket (2), allowing said push cables (6) to remain between the two rubber pieces (8).

10 Claims, 5 Drawing Sheets

8

11

8

Detail A

DAMPING ELEMENT FOR EXCAVATOR BUCKETS

TECHNICAL FIELD

The field of the utility model is developed in the field of elements for excavator shovels, more specifically, it refers to a damping element to protect the boom of the excavator shovel from impacts of the bucket.

DESCRIPTION OF THE PRIOR ART

In cable excavator shovels, there is a risk, during operation, that the bucket may impact the shovel boom, causing damage to it, so there is a need to incorporate a boom protection to avoid direct damage to the shovel. the shovel or the use of a shock absorber that avoids possible direct hits of the bucket against the boom.

Currently, the industry uses a damping element (A), as can be seen in FIG. 1, located in the lower part of the boom, in a position in which the bucket could impact the boom. The use of said damping element (A) presents operational problems that condition its implementation. In this regard, its location on the boom represents a high risk for operators since the replacement of this element in a mine involves work at height (H) and with a load suspended in an area where, to fix that load, access must be obtained from the side. lower or on the side of the boom, so that the operation cannot be carried out in optimal conditions, which leads to avoiding the replacement, leaving the excavator blade unprotected when the damping element (A) wears out. When the shock absorber element (A) of the excavator shovel is damaged/wears out and is not replaced, there is no longer any protection against possible impacts of the bucket on the boom, cables and/or drive mechanism (crown crowd), so if it occurs an impact will involve higher repair costs. In this case, the replacement operation must necessarily be carried out from the bottom up, lifting the shock-absorbing element (A), making its installation difficult since said element (A) can tilt during the operation, with the risk of an accident for the operator due to impact. of the damping element (A).

The proposed utility model solves these problems by providing a design in which the replacement of the damping element implies a low risk, being installed in an easily accessible area, so that the damping element replacement procedure can be carried out with the bucket at hand. ground level, where the shock-absorbing element is lighter and more manageable, thus reducing the risk of a suspended load, facilitating maintenance work. Besides, This new design fully protects the drive mechanism (crowd crown), cushions impacts on the boom and its design prevents impact on the cables of the blade.

UTILITY MODEL SUMMARY

The utility model refers to a damping element for a bucket of cable excavator shovels, which cushions the eventual impacts or blows of the bucket on the boom of the excavator shovel, protecting its components. The damping element is installed on the bucket door supports, facilitating or favoring the replacement procedure, when said damping element is damaged or worn, facilitating bucket maintenance. The location of the damping element in the bucket of the cable excavator shovel favors the safety conditions in the mining work and during replacement operations, since said damping element is easily accessible, it reduces the risk of suspended load since the element shock absorber is lighter, making it easier to handle, and the replacement procedure is carried out with the bucket at ground level, making it easier to handle.

In this way, this utility model provides a damping element for a bucket of cable excavator shovels that improves the protection conditions of the components of the excavator shovel and facilitates the replacement operations of said damping element, favoring the safety of said operation. With the present damping element, it is possible to replace it by mounting it from top to bottom, that is, the damping element is previously raised, to then be brought closer to the bucket and lowered to fix it on the bucket door, reducing the risk of a suspended load near the bucket. the operators.

The damping element comprises a metal base with arch guard-type rubber bumpers in which said damping element is welded to the bucket door supports.

DETAILED DESCRIPTION OF THE UTILITY MODEL

Figure 1:
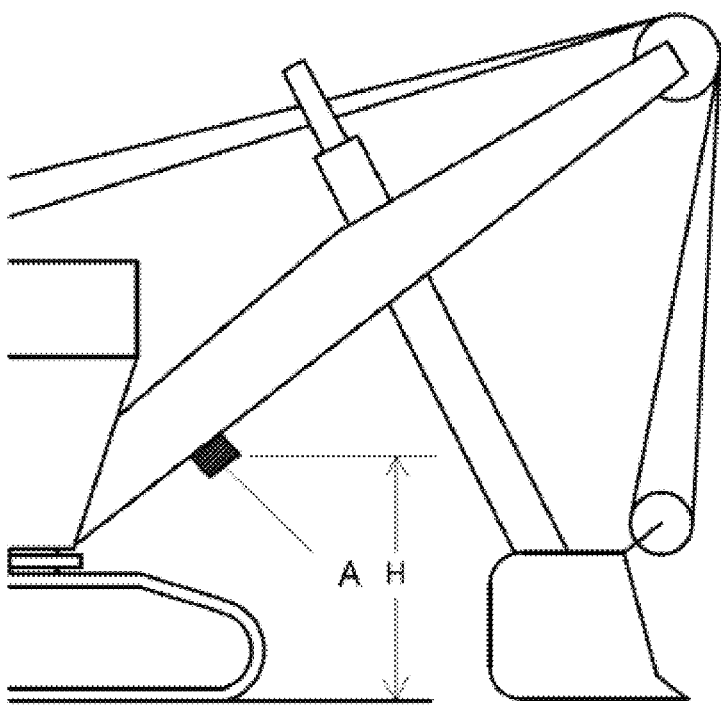
FIG. 1 shows a schematic drawing that shows the arrangement of the damping element in cable blades in the state of the art and the current working height.

The utility model refers to a damping element (1) for a bucket (2) with a door (4) of a cable excavator shovel, which prevents the blows or impacts of said bucket (2) with a boom (3) of the rope excavator shovel during its operation. The cable shovel includes push cables (6) connected to the bucket (2) to control its tilt.

Figure 2:
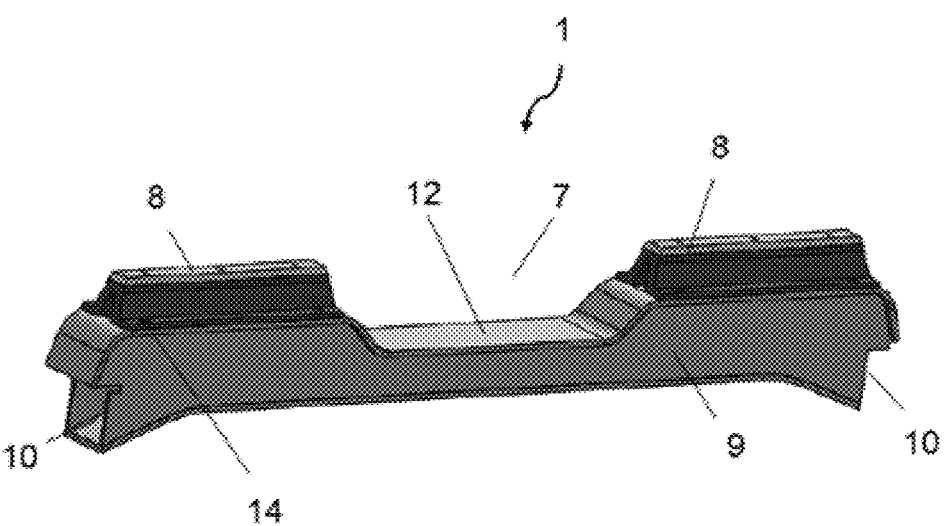
FIG. 2 shows a perspective view of the damping element of the model.
Figure 3:
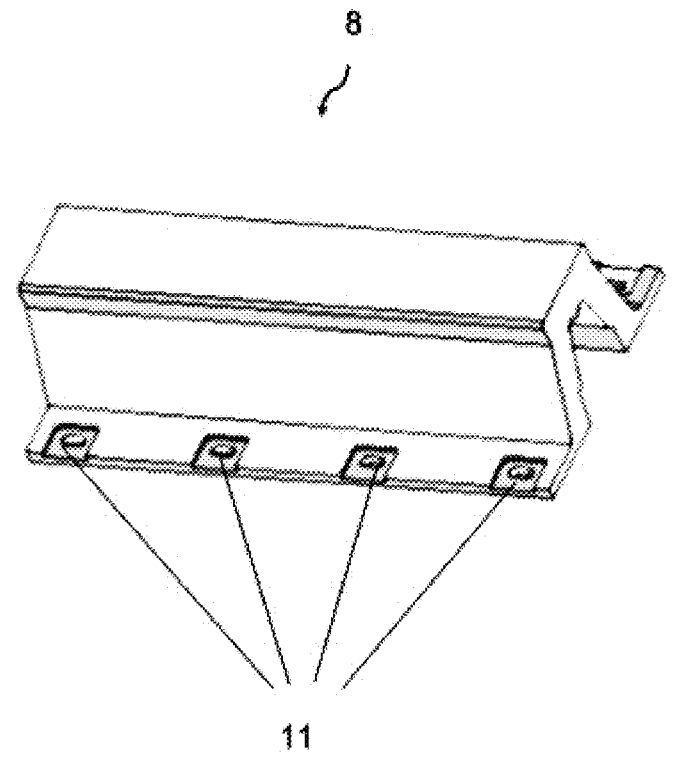
FIG. 3 shows a form of the rubber piece that corresponds to a goal defense.
Figure 4:
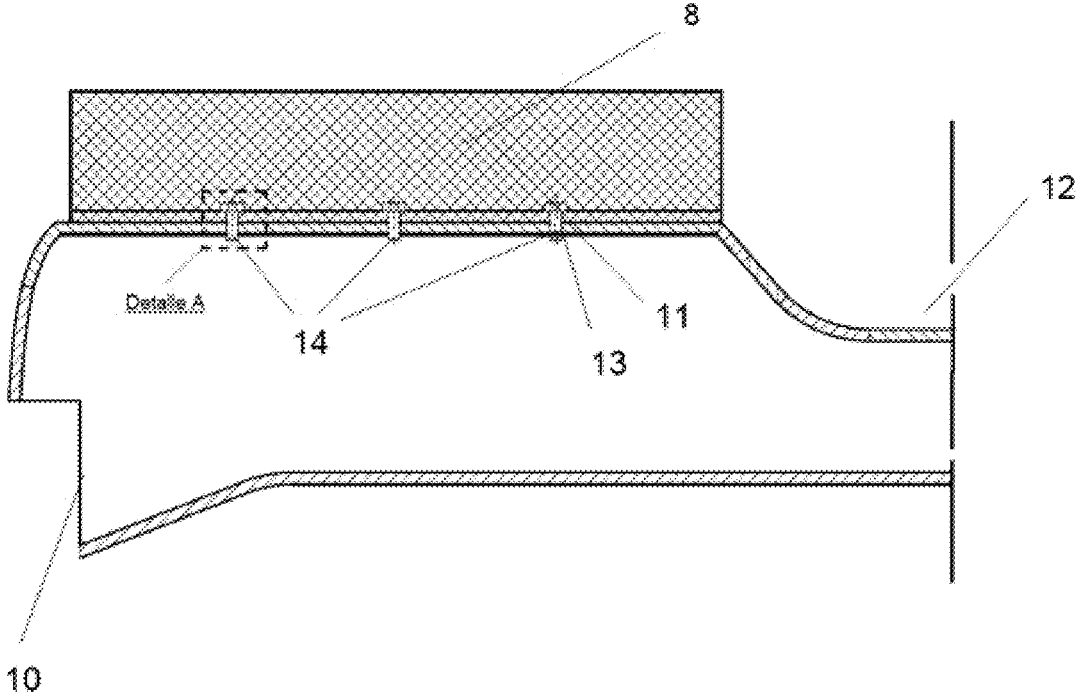
FIG. 4 shows a section of one side of the damping element where the union of the rubber parts with the metal base can be seen.
Figure 5:
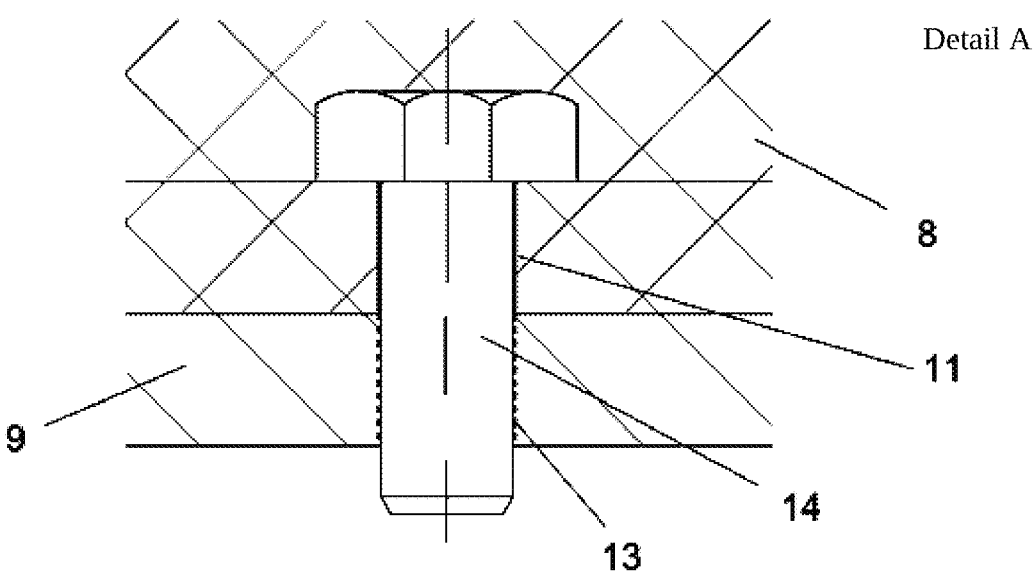
FIG. 5 shows a detail of FIG. 4 of the joint of the bolt that joins one of the rubber pieces with the metal base.

FIG. 2 shows the damping element (1), according to a preferred modality of the utility model, which comprises a metal base (9) and two rubber pieces (8) on said metal base (9), where said pieces rubber (8) are separated by an intermediate space (7) defined by a central longitudinal recess (12) of the metal base (9). The rubber pieces (8) can be of the arch guard type or sections or longitudinal pieces of a goal guard, as shown in FIG. 3. The metal base (9) corresponds to an elongated element that is formed by the union of welded steel plates so that the damping element (1) is hollow inside and, therefore, lighter, also comprising joining surfaces (10) at each end. To fix the rubber pieces (8) in the metal base, side perforations (11) are included in said rubber pieces (8) and thread perforations (13) in the metal base (9) through which bolts are fixed. (14) that go through the lateral perforations (11) of the rubber pieces (8) and are screwed into the perforations with thread (13) of the metal base (9), as shown in FIGS. 4 and 5.

Figure 6A:
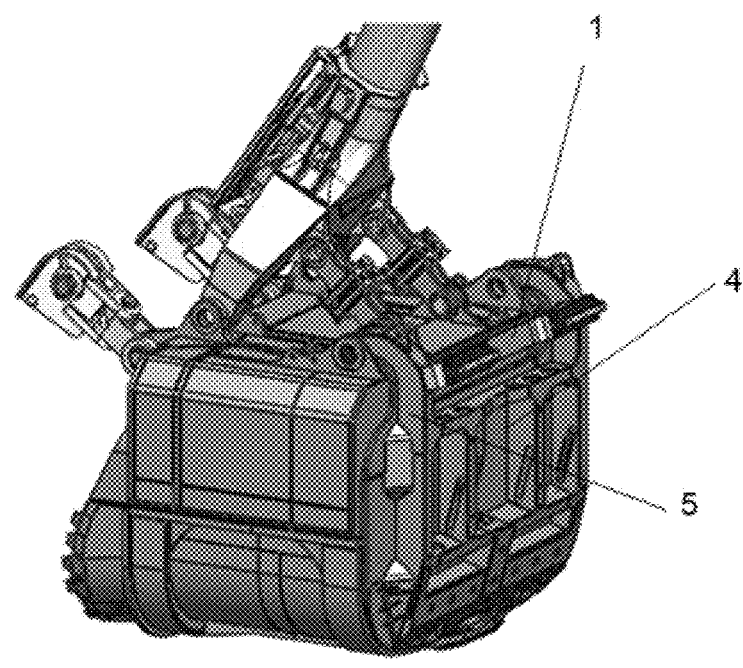
FIG. 6A shows a rear perspective view of a bucket with a damping element installed according to the utility model.
Figure 6B:
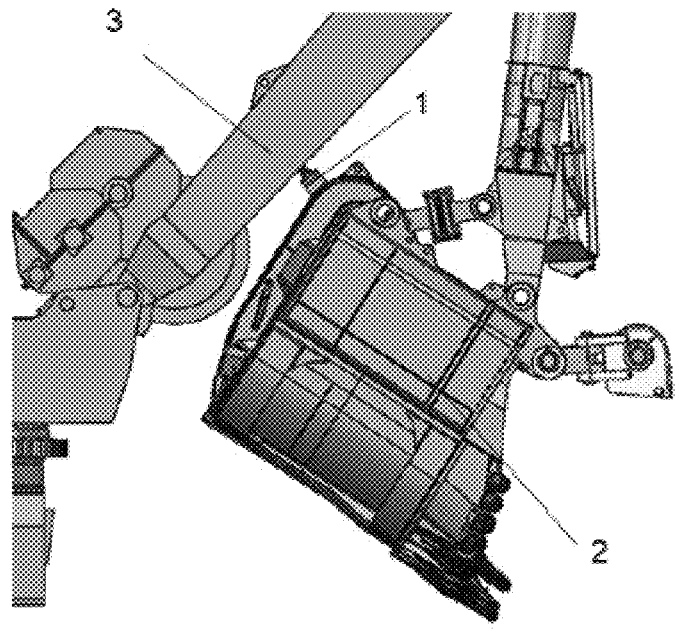
FIG. 6B shows a side view of a bucket and the position of the damping element when the bucket is in contact with the boom of the excavator.

The damping element (1) is assembled by means of a welded connection to the supports (5) of the door (4) of the bucket (2) of the cable excavator shovel so that it is located in the upper part of the outer surface of said door. (4) as shown in FIG. 6A. The damping element (1) is joined by welding the joining surfaces (10) at each end of the damping element (1) with the supports (5) of the door (4). In this way, when the bucket (2) approaches the boom (3) of the excavator shovel, the damping element (1) comes into contact with said boom (3) before the structure of the bucket (2), where the rubber parts (8) of the damping element (1) are in contact with the surface of the boom preventing the bucket from impacting and damaging the boom (3) during the operation of the cable excavator shovel, as described shown in FIG. 6B.

Figure 7:
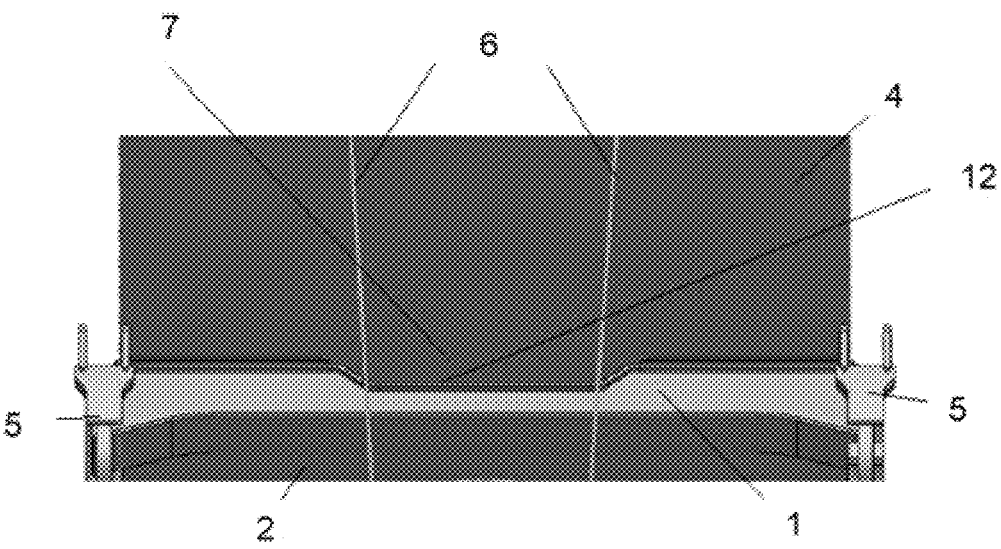
FIG. 7 shows the passage of the push cables of the handle through an intermediate space in the damping element when the bucket contacts the boom of the excavator shovel.

The intermediate space (7) that is formed in the metal base (9) by the central longitudinal recess (12), allows the push cables (6) of the bucket (2) to remain between the two rubber pieces (8), preventing said push cables (6) of the bucket (2) from being damaged during a possible collision between the bucket (2), the excavator shovel and its boom (3) when the push cables (6) remain trapped between the pieces the pen (3) and the bucket (2), as shown in FIG. 7.

Figure 8:
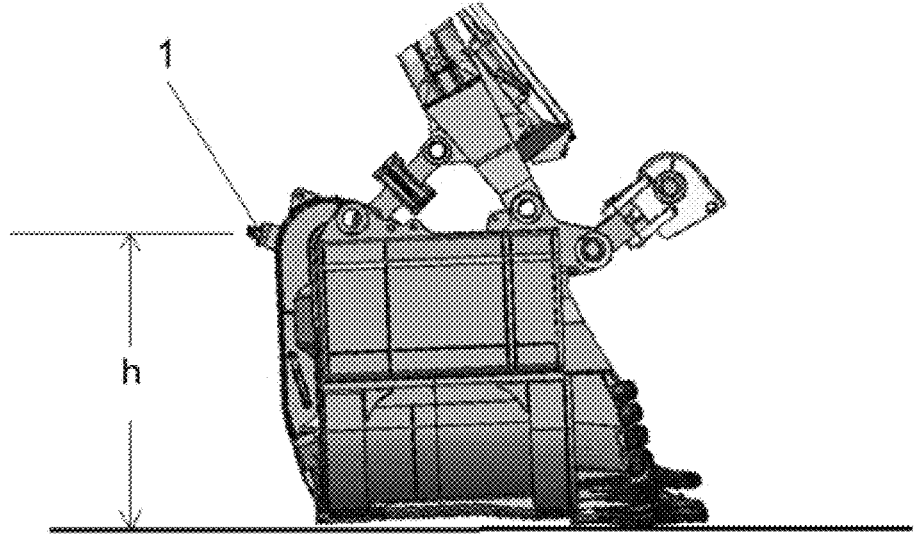
FIG. 8 shows the location of the damping element, according to the utility model, installed in a bucket and the working height.

The damping element (1) being assembled by means of a welded connection to the supports (5) of the door (4) of the bucket (2) allows the replacement operation of the damping element (1) to be carried out resting the bucket (2) on the ground or surface, as shown in FIG. 8, so that the damping element is at a height (h) less than the height (H) of the configuration of the damping element (A) available in the prior art, where in addition, access to said damping element (1) is facilitated. In this way, the present utility model allows one or more operators to have to work in an uncomfortable position and at a significant height that has a greater risk and possibility of an accident when proceeding with the replacement of a damping element. With the present damping element (1), it is possible to replace it by mounting it from top to bottom, that is, the damping element (1) is previously raised, to then be brought closer to the bucket (2) and lowered to fix it on the door (4) of the bucket (2), reducing the risk of a suspended load near the operators.

The invention claimed is:

1. A shock-absorbing element (1) for a bucket (2) with door (4) of cable excavator shovels, comprising push cables (6) connected to the bucket (2) to control its inclination, to cushion impacts of the bucket (2) on a boom (3) of the excavator shovel, improving the protection of the boom (3) and the push cables (6) of said excavator shovel and facilitates the maintenance of the excavator shovel, wherein the shock-absorbing element (1) comprising:

an elongated metal base (9), hollow inside, comprising joining surfaces (10) at each end configured to join to the upper part of the door (4) of the bucket (2) and a central longitudinal recess (12) defining an intermediate space (7); and two rubber pieces (8) fixed to the elongated metal base (9), said rubber pieces (8) being separated by the intermediate space (7) defined by said central longitudinal recess (12), wherein the intermediate space (7) defined by the central longitudinal recess (12) is configured to receive the push cables (6) of the bucket (2), allowing said push cables (6) to remain between the two rubber pieces (8).

2. The shock-absorbing element (1) according to claim 1, wherein the elongated metal base (9) is formed by the union of welded steel plates.

3. The shock-absorbing element (1) according to claim 1, wherein the rubber pieces (8) are shaped in the form of an arch guard or sections or pieces shaped in the form of an arch guard.

4. The shock-absorbing element (1) according to claim 1, wherein the rubber pieces (8) are fixed to the elongated metal base (9) by bolts (14) that go through lateral perforations (11) included in said rubber pieces (8) and screwed into thread perforations (13) included in the elongated metal base (9).

5. A bucket (2) with a door (4) for a cable excavator shovel comprising push cables (6) connected to the bucket (2) to control its inclination to cushion impacts of the bucket (2) on a boom (3) of the excavator shovel, improving protection of the boom (3) and the push cables (6) of said excavator shovel and facilitates maintenance of the excavator shovel, wherein the bucket (2) has a shock-absorbing element (1) mounted, the shock-absorbing element (1) comprising:

an elongated metal base (9), hollow inside, comprising joining surfaces (10) at each end and configured to join to an upper part of the door (4) of the bucket (2) a central longitudinal recess (12) defining an intermediate space (7); and two rubber pieces (8) fixed to the metal base (9), said rubber pieces (8) being separated by the intermediate space (7) defined by said central longitudinal recess (12),;

wherein the shock-absorbing element (1) is mounted on the bucket (2) at the upper part of the door (4) through the joining surfaces (10) of the elongated metal base (9), and wherein the intermediate space (7) defined by the central longitudinal recess (12) is configured to receive the push cables (6) of the bucket (2), allowing said push cables (6) to remain between the two rubber pieces (8).

6. The bucket (2) according to claim 5, wherein the joining surfaces (10) are mounted to the upper part of the door (4) through a welded connection on supports (5) of the door (4).

7. The bucket (2) according to claim 5, wherein the elongated metal base (9) is formed by the union of welded steel plates.

8. The bucket (2) according to claim 5, wherein the rubber pieces (8) are shaped in the form of an arch guard or sections or pieces shaped in the form of an arch guard.

9. The bucket (2) according to claim 5, wherein the rubber pieces (8) are fixed to the elongated metal base (9) by bolts (14) that go through lateral perforations (11) included in said rubber pieces (8) and is screwed into thread perforations (13) included in the elongated metal base (9).

10. A cable excavator shovel comprising a boom (3) having a bucket (2) connected with a door (4) and push cables (6) connected to the bucket (2) to control its inclination, wherein the excavator shovel allows cushioning impacts of the bucket (2) on the boom (3), improving the protection of the boom (3) and the push cables (6) and facilitates maintenance of the excavator shovel, wherein the bucket (2) has a shock-absorbing element (1) mounted, the shock-absorbing element comprising:

an elongated metal base (9), hollow inside, comprising joining surfaces (10) at each end configured to join to an upper part of the door (4) of the bucket (2) and a central longitudinal recess (12) defining an intermediate space (7); and two rubber pieces (8) fixed to the metal base (9), said rubber pieces (8) being separated by the intermediate space (7) defined by said central longitudinal recess (12), wherein the shock-absorbing element (1) is mounted on the bucket (2) at the upper part of the door (4) through the joining surfaces (10) of the elongated metal base (9), and wherein the intermediate space (7) defined by the central longitudinal recess (12) is configured to receive the push cables (6) of the bucket (2), allowing said push cables (6) to remain between the two rubber pieces (8).

\* \* \* \* \*